United States Patent [19]

Goettl

[11] 4,045,523
[45] Aug. 30, 1977

[54] EVAPORATIVE COOLER WITH SUPERIMPOSED DISPOSABLE PAD ASSEMBLIES

[76] Inventor: Adam D. Goettl, P.O. Box 10036, Phoenix, Ariz. 85016

[21] Appl. No.: 585,389

[22] Filed: June 9, 1975

[51] Int. Cl.$^2$ .............................................. B01D 1/00
[52] U.S. Cl. .................................... 261/97; 261/106; 261/DIG. 41
[58] Field of Search .................................. 261/94–97, 261/99, 100–107, DIG. 15, DIG. 41; 261/29, 30

[56] References Cited

U.S. PATENT DOCUMENTS

| | | | |
|---|---|---|---|
| 1,898,591 | 2/1933 | Mohler et al. | 261/103 |
| 2,118,044 | 5/1938 | Gudmundsen | 261/30 X |
| 2,535,386 | 12/1950 | Brookins | 261/106 X |
| 2,778,203 | 1/1957 | Griffith | 261/30 X |
| 2,798,421 | 7/1957 | Hardesty | 261/29 X |
| 2,856,166 | 10/1958 | Goettl | 261/29 |
| 3,075,750 | 1/1963 | Goettl | 261/97 |
| 3,150,210 | 9/1964 | Goettl | 261/96 |
| 3,179,386 | 4/1965 | Liebmann | 261/97 X |
| 3,243,170 | 3/1966 | Ellis et al. | 261/94 |
| 3,284,068 | 11/1966 | Goettl | 261/97 |
| 3,491,746 | 1/1970 | Swimmer et al. | 261/DIG. 15 X |
| 3,497,188 | 2/1970 | McDuffee | 261/99 |
| 3,722,838 | 3/1973 | Swimmer et al. | 261/100 X |

FOREIGN PATENT DOCUMENTS 285,561   2/1928   United Kingdom ............. 261/97

*Primary Examiner*—Frank W. Lutter
*Assistant Examiner*—William A. Cuchlinski, Jr.

[57] ABSTRACT

An evaporative cooler with superimposed pad assemblies adapted to provide for efficient operation of an evaporative cooler having substantially greater elevation and corresponding area, than conventional evaporative coolers of a comparable horizontal cross section, wherein progressive redistribution of water from rearward lower portions of superimposed pad assemblies toward upper inlet sides of the respective pad assemblies provides for great cooling capacity in proportion to the horizontal cross section of a cooler. The disclosure also including details of disposable pad assemblies for superimposed disposition relative to each other in an evaporative cooler in spaced relation to an inlet louver grill thereof. The disclosure being additionally related to the normal operation of superimposed evaporative cooler pad assemblies to prevent thinning of the saturated pad area of evaporative cooler pads near their lower portions in response to air flow from the inlet to the outlet sides of such pad assemblies. Further the disclosure relates to one standard size of evaporative cooler pad for coolers of various CFM capacities.

The disclosure also relates to an evaporative cooler having means for opening the top thereof directly above the evaporative cooler pads and their respective water receiving troughs so as to provide for visual inspection of the flow of water into said troughs whereby proper adjustments may be made so that water is uniformly distributed to the troughs and the various evaporative cooler pads of the evaporative cooler.

2 Claims, 18 Drawing Figures

FIG. I.

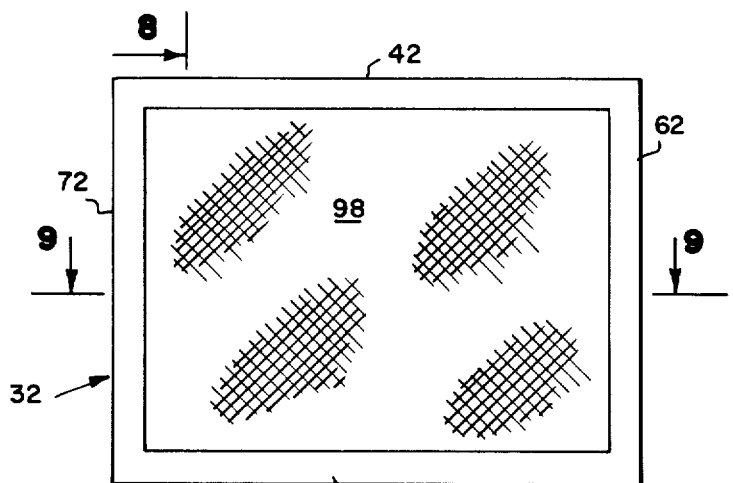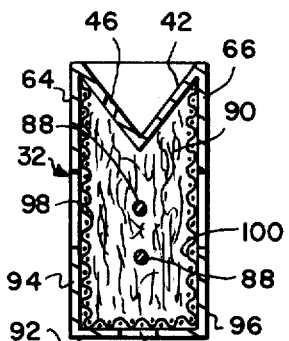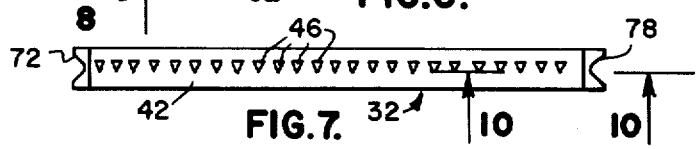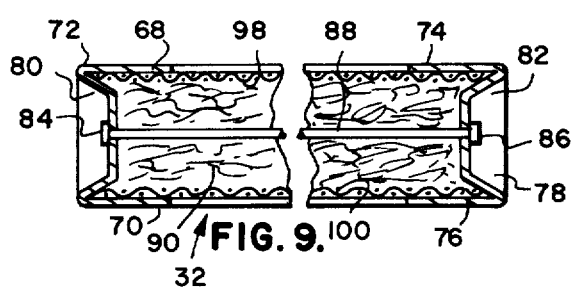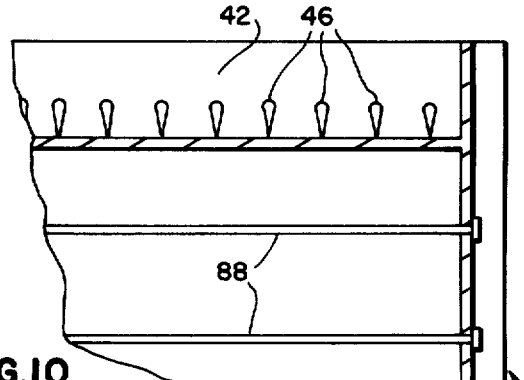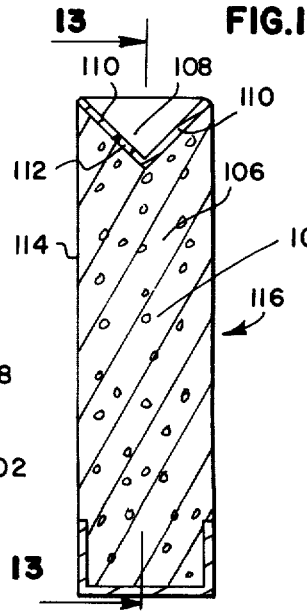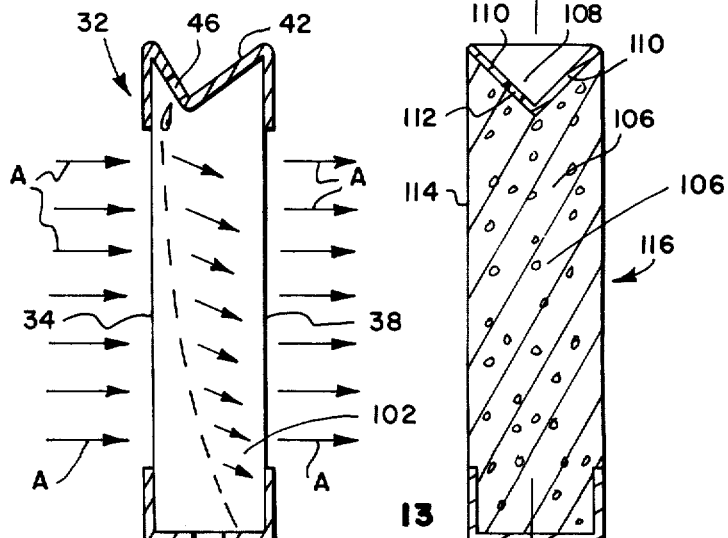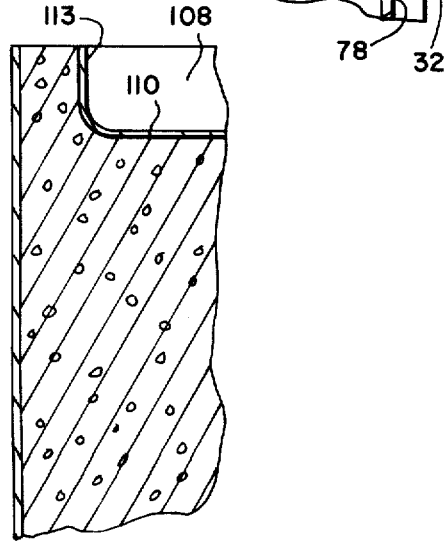

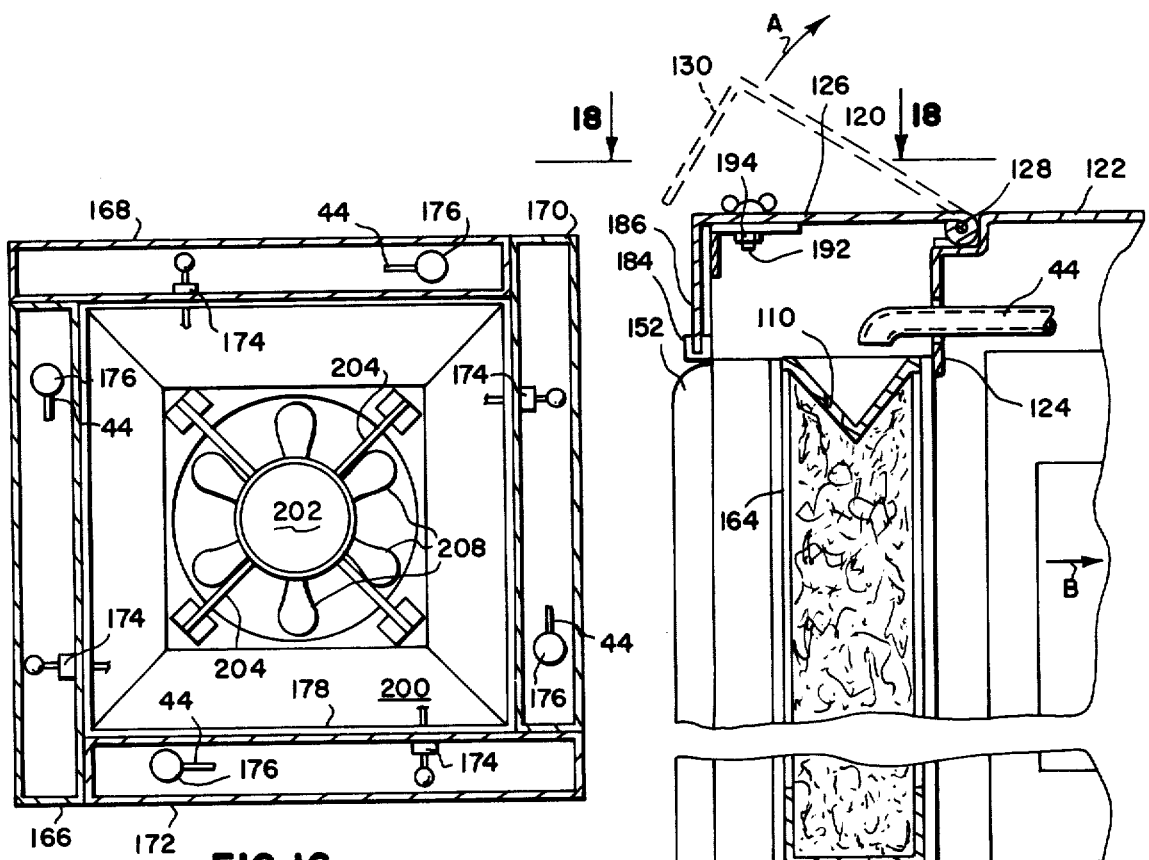
FIG.16.
FIG.17.
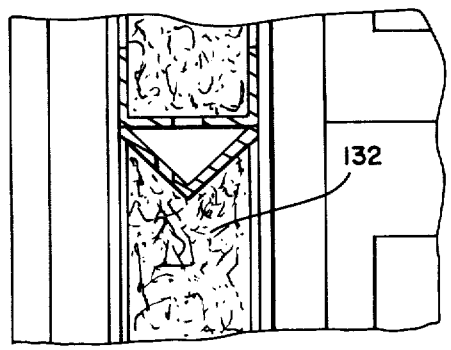
FIG.18.
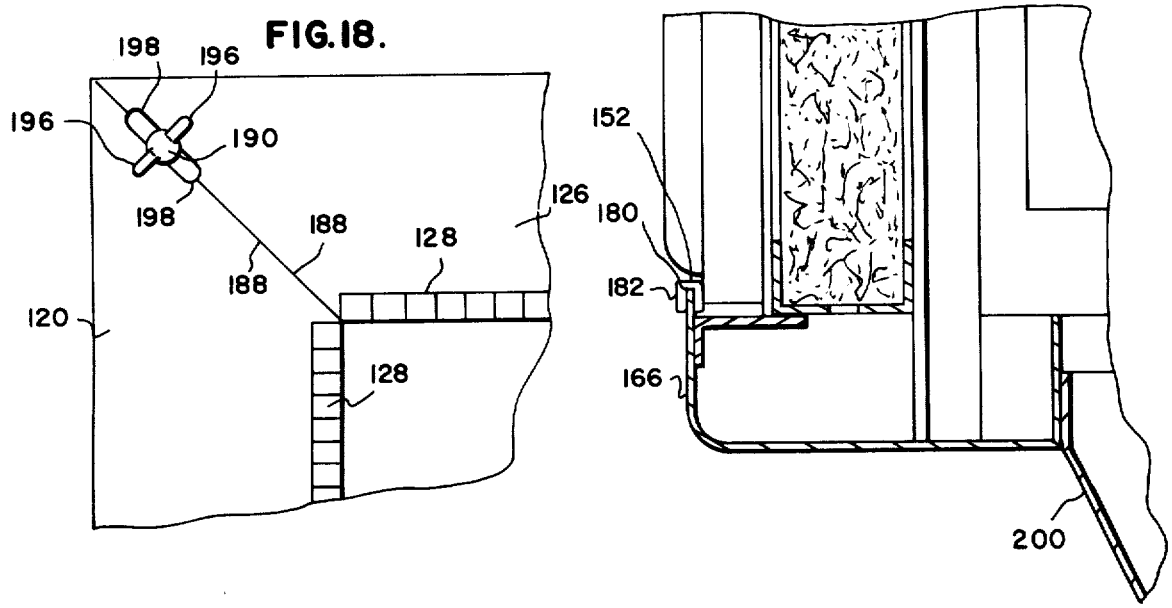

EVAPORATIVE COOLER WITH SUPERIMPOSED DISPOSABLE PAD ASSEMBLIES

PRIOR ART

U.S. Pat. Nos. 3,075,750 and U.S. Pat. 3,086,759 are believed to be pertinent prior art.

BACKGROUND OF THE INVENTION

Evaporative coolers have heretofore been constructed so that water which gravitates downwardly through an evaporative cooler pad has saturated material such as aspen fibers and air passing through the pad from the inlet side to the outlet side thereof has vaporized water and consequently attained an evaporative cooling of the air. During the gravitation of the water from the upper portion to the lower portion of the pad, the air passing through the pad tends to force the water toward the outlet side of the pad and causes a thinning of the saturated area of the pad near the lower portion thereof. Consequently, the vertical dimension of such pads has been limited to a size which does not promote undue thinning of the saturated area of the fibers of the pad near the lower portions thereof. Consequently, the overall capacity of evaporative coolers has been substantially limited relative to the horizontal cross sectional area of evaporative coolers which are usually in several forms, one of which is the conventional downward delivery type with evaporative cooler pad assemblies on four sides of the evaporative cooler. Others are of the side delivery type of which there are three evaporative cooler pad assemblies and one side delivery duct from the cooler for the delivery of evaporatively cooled air. It has been a problem, however, to obtain substantial capacity of an evaporative cooler without increasing the horizontal cross section of the cooler due to the fact that efficient operation of evaporative cooler pads is limited to a certain elevation in proportion to the thickness of the pad from the inlet to the outlet side thereof. Accordingly, prior art evaporative coolers have, of necessity, been somewhat limited in vertical dimensions of the evaporative cooler pad assemblies relative to the thickness of the pad assemblies from the inlet to the outlet sides thereof and such thickness is a factor related to the economy of initial production of evaporative coolers as well as replacement of such pads.

Prior art evaporative coolers have had enclosed tap structures above the evaporative cooler water receiving trough areas and it has, therefore, been difficult to inspect the troughs to determine whether or not the water delivery is uniform and to thus maintain proper wetting of all of the pads in an evaporative cooler. The flow distribution of water in an evaporative cooler pad is extremely important due to the fact that dry holes may occur through which air may flow through the pads in the event portions of the pads are not properly wetted by suitable flow from the respective trough structures.

In accordance with the foregoing, it will be appreciated that large evaporative coolers have heretofore been of a large horizontal cross sectional area and have also required relatively thick evaporative cooler pad assemblies. Evaporative coolers of the large sizes have been used for cooling industrial buildings or the like, and the initial cost of such evaporative coolers, as well as the size thereof and the maintenance costs, have been substantial. From the foregoing, it will be appreciated that prior art evaporative coolers of different CFM capacities have employed evaporative cooler pads of many different lateral and vertical dimensions which has prevented standardization of one size of evaporative cooler pad for coolers of various CFM capacities.

SUMMARY OF THE INVENTION

The present invention is related to an evaporative cooler wherein a plurality of superimposed pad assemblies are each provided with a water trough at the upper portion thereof and a drain at the lower portion thereof so that the drain of one pad assembly will drain water into the trough of the next lower pad assembly, and each trough is arranged to redistribute water to the inlet side of the respective pad assembly so that the force of air passing from the inlet to the outlet side of the pad assemblies tending to thin the saturated area of the pad near its lower portion is obviated due to the fact that each pad assembly causes redistribution of the water to the inlet side of the respective pad assembly, and inasmuch as the pad assemblies are superimposed, a plurality of such pad assemblies may operate very efficiently in an evaporative cooler having a substantial elevation in relation to its horizontal cross section.

The invention comprises novel means for opening the top of the cooler housing directly above the evaporative cooler pad water receiving troughs so as to provide for inspection and/or adjustment of the water delivering facilities as well as the disposition of the troughs so that all of the pad area therebelow is uniformly wetted for efficient evaporative cooler operation.

The invention also relates to a disposable pad assembly, particularly adapted for use in an evaporative cooler where the disposable pad assemblies are superimposed such that each pad assembly is provided with a trough adapted to receive water from the drain of a next upper pad assembly in the superimposed relationship of such pad assemblies. The invention provides for the use of superimposed pad assemblies allowing a more compact evaporative cooler from the standpoint that it occupies a relatively small horizontal cross section in proportion to its CFM capacity.

Furthermore, the invention provides for the use of one size of evaporacooler pad for use in a great variety of coolers having a wide range of CFM capacities. Additionally, the invention provides for economic disposal of the pad assemblies after they have been used for a given period of time and have become loaded with minerals or the like.

Another advantage of the invention is that each pad assembly includes a new clean trough having clean water outlet openings which are very accurate and efficient compared to prior art troughs, under which evaporative pad material has been replaced and in which the water outlet openings are oftentimes plugged with mineral deposits or corrosion.

Accordingly, it is an object of the invention to provide an evaporative cooler having a plurality of superimposed pad assemblies adapted to provide for efficient evaporative cooler operation of large capacity in relation to the horizontal cross sectional area of the evaporative cooler and in relation to the water saturation thickness of the pads from the inlet sides to the outlet sides, all of which provides for compactness and economy of the production as well as the maintenance of evaporative coolers in accordance with the invention.

Another object is to provide an evaporative cooler construction whereby a standard size pad may be used in many different coolers having a wide range of CFM capacities.

Another object of the invention is to provide an evaporative cooler housing having means for opening the top thereof directly above evaporative cooler pad water receiving trough structures so as to permit inspection of the flow of water through the troughs and to provide access means for adjusting such flow so that each evaporative cooler pad is properly wetted by efficient water flow therethrough.

Another object of the invention is to provide a novel disposable evaporative cooler pad assembly having an integral trough for use in efficient reconditioning of evaporative coolers.

Another object of the invention is to provide a novel disposable pad assembly for use in superimposed relationship in evaporative coolers.

Another object of the invention is to provide a novel superimposed assembly of a plurality of evaporative cooler pad assemblies so as to obviate the problem attendant to the thinning of the saturated area of the pad at its lower portion during the flow of air from the inlet to the outlet sides of the pad assemblies.

Further objects and advantages may be apparent from the following specification, appended claims and accompanying drawings.

BRIEF DESCRIPTION OF THE DRAWINGS

FIG. 6 is a side elevational view of a disposable pad assembly in accordance with the present invention;

FIG. 7 is a top or plan view of the pad assembly shown in FIG. 6;

FIG. 8 is an enlarged fragmentary sectional view taken from the line 8—8 of FIG. 6;

FIG. 9 is an enlarged plan sectional view taken from the line 9—9 of FIG. 6;

FIG. 10 is an enlarged fragmentary vertical sectional view taken from the line 10—10 of FIG. 7;

FIG. 11 is a diagramatic vertical sectional view of an evaporative cooler pad assembly showing the flow of air from the inlet to the outlet sides thereof and showing the gravitation of water through the evaporative cooler pad structure of the assembly and showing the path of water gravitating downwardly through the evaporative cooler pad being forced toward the outlet side thereof by the cross flow of air therethrough;

FIG. 12 is a vertical sectional view of the modification of an evaporative cooler pad assembly of the invention;

FIG. 13 is a fragmentary sectional view taken from the line 13—13 of FIG. 12;

FIG. 16 is a reduced plan sectional view taken from the line 16—16 of FIG. 14;

FIG. 17 is a fragmentary sectional view taken from the line 17—17 of FIG. 14 but showing the structure on an enlarged scale; and FIG. 18 is a fragmentary plan view taken from the line 18—18 of FIG. 17.

DESCRIPTION OF THE PREFERRED EMBODIMENTS

Figure 1:
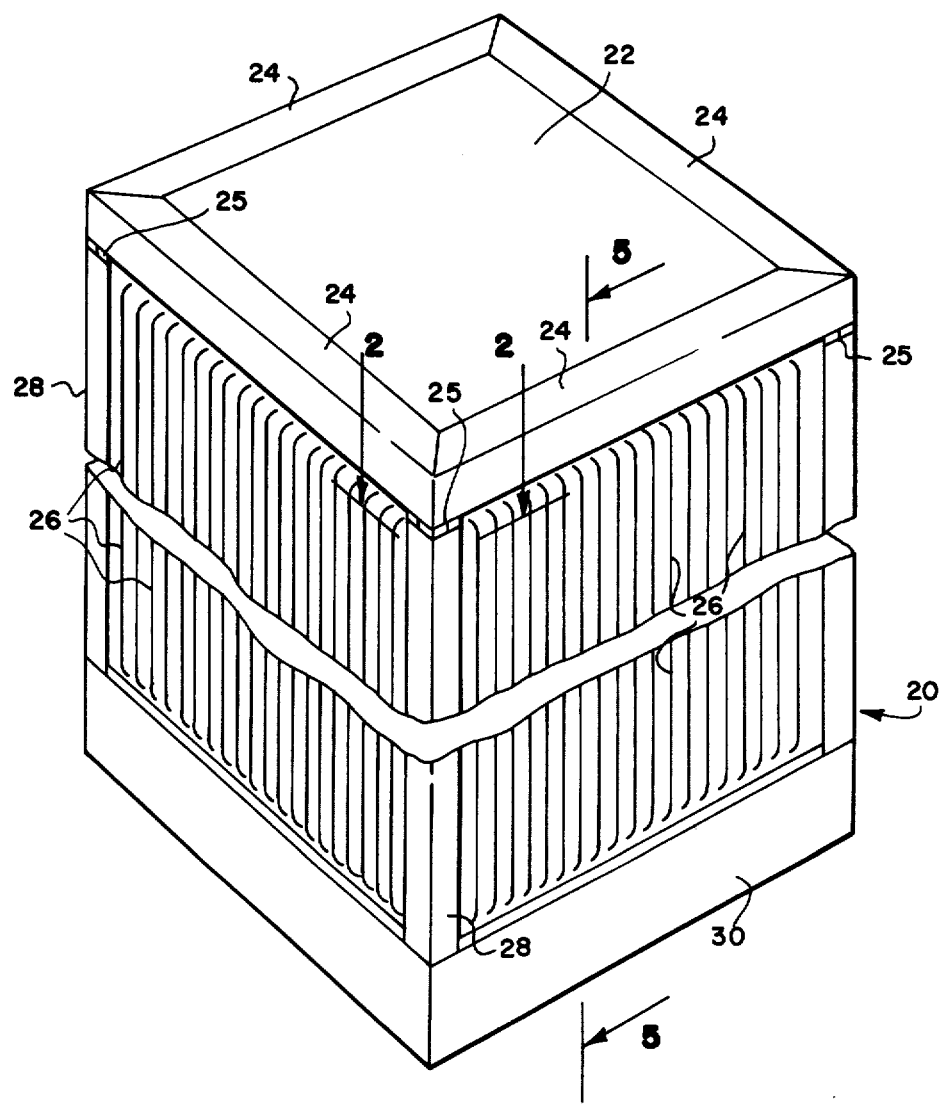
FIG. 1 is a fragmentary perspective view of an evaporative cooler in accordance with the present invention.
Figure 5:
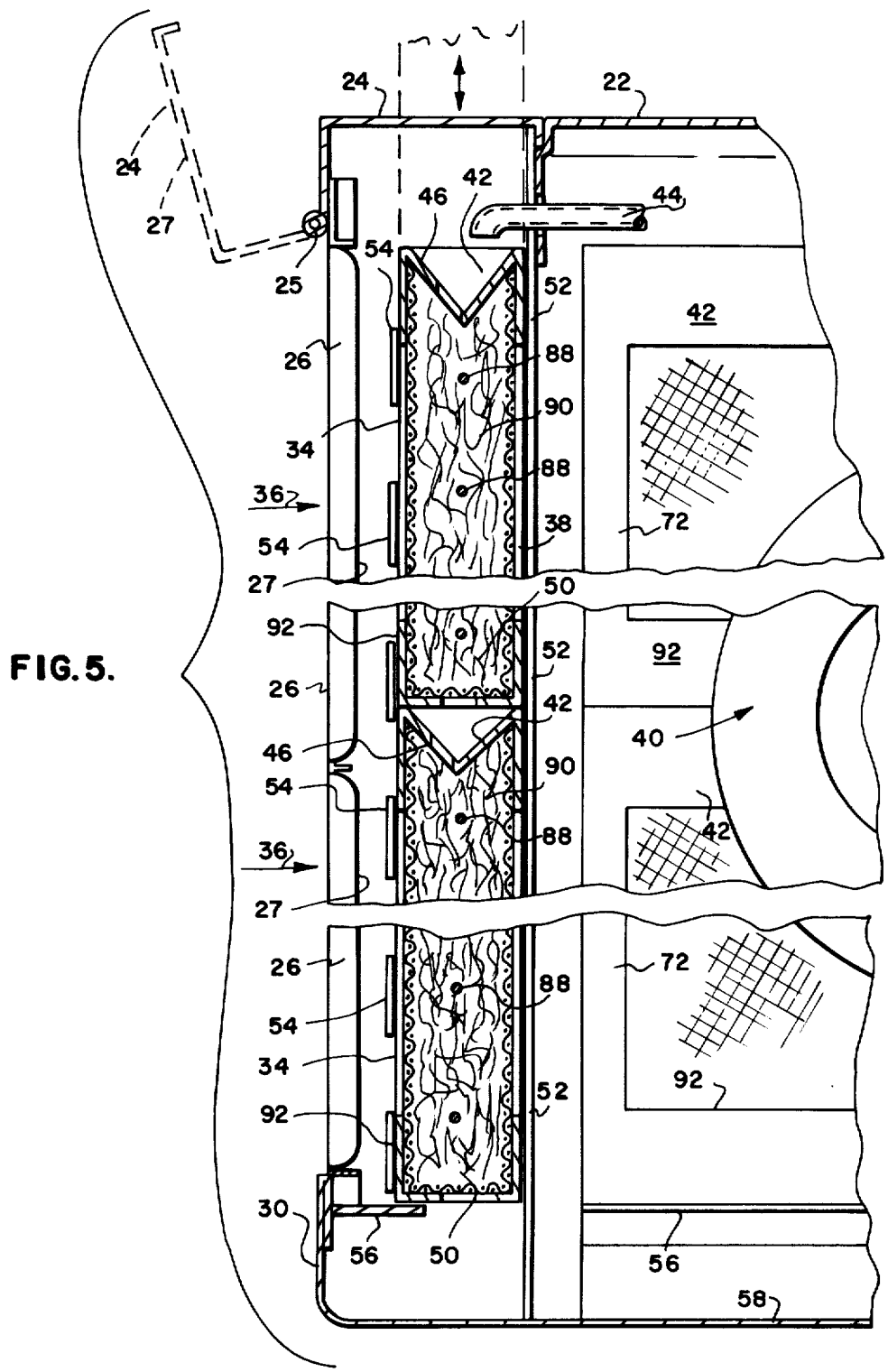
FIG. 5 is an enlarged vertical fragmentary sectional view taken from the line 5—5 of FIG. 1.

As shown in FIGS. 1 and 5 of the drawings, the invention comprises an evaporative cooler 20 in accordance with the present invention. This evaporative cooler 20 is provided with a top 22, and pivotally movable access doors 24 at the sides of the top. A plurality of louver plates 26 are disposed at the sides of the evaporative cooler, which are held by vertical corner elements 28 of the frame of this evaporative cooler and a sump pan 30 is secured to the corner elements providing a unitary assembly of the elements of the evaporative cooler.

Referring to FIG. 5 of the drawings, it will be seen that a plurality of evaporative cooler pad assemblies 32 are disposed in spaced relation to each louver grill 26 such that an inlet side 34 of each evaporative cooler pad assembly is disposed to receive air which passes through the louver grill in a direction of arrows 36 to the respective inlet sides 34 of each evaporative cooler pad assembly 32 and the air passes through these evaporative cooler pad assemblies to their outlet sides 38 and a conventional blower 40 internally of the evaporative cooler is a means by which the air is forced through the evaporative cooler pad assemblies from the inlet sides 34 to their outlet sides 38, all of which will be hereinafter described in detail.

The uppermost evaporative cooler pad assembly 32 is provided with a trough 42 adapted to receive water from a conduit 44, and the trough 42 is provided with a plurality of water distributor openings 46, adapted to deliver water toward the inlet side 34 of the respective evaporative cooler pad assembly 32. The uppermost evaporative cooler pad assembly as shown in FIG. 5 is provided with an outlet 48 at its lower portion 50, and this outlet 48 is disposed directly above a trough 42 on a next lower evaporative cooler pad assembly 32, and this trough is also provided with water distributor outlet 46 as will be hereinafter described in detail. These outlets 46 are also disposed to redistribute water such that it is directed toward the respective inlet side 34 of the next lower evaporative cooler pad assembly 32, so that water progressively moves toward the outlet side 38 of each evaporative cooler pad assembly and is then drained from a respective outlet at the lower portion of the pad to the next lower trough, at which time the water is redirected to the inlet side of the respective assembly and in this manner the combined elevation or vertical dimension of the plurality of evaporative cooler pad assemblies may be quite great in proportion to the horizontal cross section of the evaporative cooler 20, as shown best in FIGS. 1 and 5 of the drawings.

Figure 2:
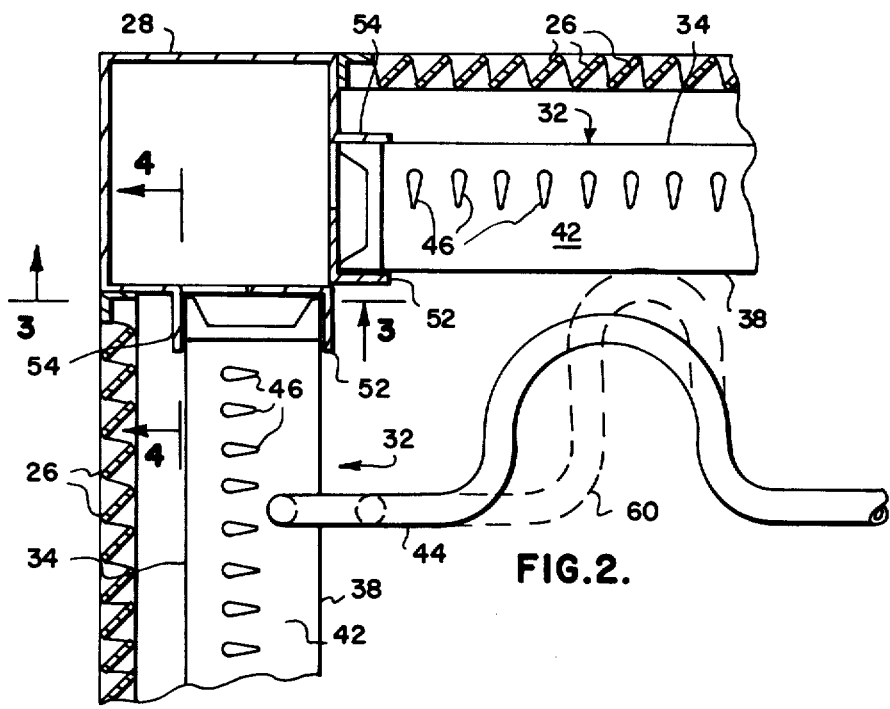
FIG. 2 is an enlarged fragmentary plan sectional view taken from the line 2—2 of FIG. 1.

Each access door 24 is pivotally mounted on the corner elements by hinges 25 and pivoted to a broken line position 27 so as to expose an area directly above the evaporative cooler pad assemblies 32 as shown best in FIGS. 2 and 5 of the drawings. The access doors 24 provide an opening at the top of the evaporative cooler directly over each evaporative cooler pad area and the evaporative cooler pad assembly are thus easily inspected from the top to determine the condition of each trough such its level condition and its distribution of water as received from the conduit 44, shown in FIGS. 2 and 5 of the drawings. Thus the top opening structure provided by the doors 24 permit a maintenance man to properly adjust the evaporative cooler so that the troughs are substantially level and provide uniform distribution of water into the pads therebelow and further, the maintenance man is able to see how the various conduits 44 are delivering water and to thereby determine if any of them are plugged or operating inefficiently.

Figure 3:
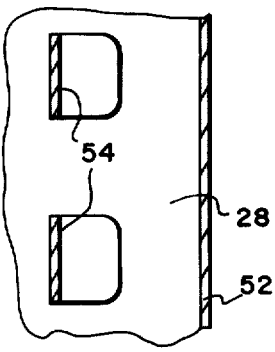
FIG. 3 is a fragmentary sectional view taken from the line 3—3 of FIG. 2.
Figure 4:
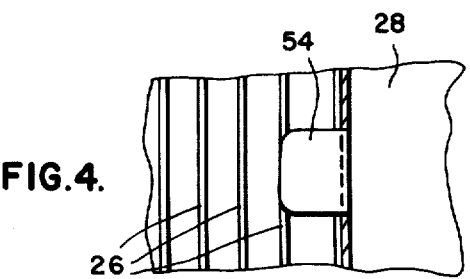
FIG. 4 is a fragmentary sectional view taken from the line 4—4 of FIG. 2.

Each corner element 28 of the evaporative cooler frame is provided with an evaporative cooler pad assembly supporting flanges 52 and punched out tabs 54 are in spaced relation with flanges 52 all as shown best in FIGS. 2, 3 and 4 of the drawings so as to provide a generally vertical and generally channel-shaped retaining means for the evaporative cooler pad assemblies 32 and such as they may be vertically placed in the evaporative cooler or vertically removed therefrom as indicated by arrows B in FIG. 5 as desired during production assembly or replacement of the disposable evaporative cooler pad assemblies as will be hereinafter described in detail.

The lower most pad assembly 32 rests upon a horizontal support 56, as shown in FIG. 5 of the drawings, above the bottom 58 of the sump pan 30, so that water passing from the outlet opening 48 in the lower portion 50 of the respective pad assembly, will gravitate into the sump pan 30 so that it may be pumped and recirculated through the respective water delivery conduits 44.

Each conduit 44, as shown in FIG. 2 of the drawings, is capable of being flexed into a broken line position 60, as shown in FIG. 2, when it is desired to install or remove the evaporative cooler pad assemblies 32 from their position between the generally channel-shaped structure provided by the flange 52 and the tabs 54 hereinbefore described.

Each evaporative cooler pad assembly as shown in FIGS. 6 to 10 inclusive is provided with a generally rectangular frame 62 of which the respective trough 42 is an upper portion. The trough 42, as shown in FIG. 8 of the drawings, is provided with a generally V-shaped trough portion having the water distributor outlet openings 46 therein, and integral with the V-shaped trough portion are respective flanges 64 and 66, which extend generally downward in a normally vertical direction. These flanges 64 and 66 are spaced apart and correspond with respective flanges 68 and 70 of a side frame portion 72. Also, the flanges 64 and 66 correspond with respective flanges 74 and 76 of another side member 78 all as shown best in FIGS. 6 to 10 inclusive of the drawings.

The side members are substantially channel-shaped in cross section and provided with respective recessed portions 80 and 82, in which heads 84 and 86 at opposite ends of retainer rods 88 are disposed. These retainer rods 88 pass horizontally through evaporative cooler pad material 90, and the rods 88 are tension rods tending to hold the evaporative cooler pad assembly in shape. The lower portion of the frame 62 is provided with a generally channel-shaped portion 92, having upstanding flanges 94 and 96, corresponding with the flanges 64 and 66 and the flanges 68 and 70, as well as the flanges 74 and 76 hereinbefore described. The frame portion 92 is provided with outlet opening means 48 as hereinbefore described.

The evaporative cooler pad material 90 is preferably of aspen fibers or any other suitable material which may be subject to the passage of air therethrough while in a water saturated condition. It will be understood that the evaporative cooler pad assembly, as shown in FIGS. 6 to 10 of the drawings, is disposable. The frame 62, including the elements 42, 72, 78 and 92, may all be made of inexpensive plastic or other suitable material, and the usual aspen fiber materials may be used to make up the pad material 90, which is retained between screens 98 and 100. These screens 98 and 100 may be made in plastic such as any suitable plastic screen material, and the peripheral edges of these screens 98 and 100 are retained by the frame 62 as, for example, a screen 98 at its peripheral edges is retained behind the flanges 68 and 70, as well as the flanges 64 and 94, all as shown in FIGS. 8 and 9 of the drawing. Likewise, the screen 100 is held behind the flanges 66 and 95 as well as the flanges 70 and 76, all as shown best in FIGS. 8 and 9 of the drawings.

This evaporative cooler pad assembly is thus disposable and is a product which may readily be produced on an assembly line basis and marketed for seasonal replacement of evaporative cooler pads in evaporative coolers, and provides for convenience of replacement without having to pack the pad material in frames as is the usual practice with conventional evaporative coolers.

It will be noted that the trough 42 is an integral part of the replacement in contrast to conventional practice in which old corroded and plugged troughs continue to be used after the pads have been replaced.

The superimposed relationship of the evaporative cooler pad assemblies 32 as shown in FIG. 5, provides for the production and operation of an evaporative cooler of great capacity, such as industrial evaporative coolers without the necessity of having a cooler which is large in horizontal cross section area, compared to its evaporative cooling capacity. The invention, as shown in FIG. 5, permits the use of a series of superimposed evaporative cooler pads, wherein water passes progressively from each trough to the front or inlet side of the pad assembly, thus returning the water forwardly to the inlet side each time it drains from the bottom of a pad assembly into a trough of a next lower pad assembly. This arrangement of superimposed pad assemblies permits an evaporative cooler to be built such that the pad assemblies have great vertical dimensions such that the overall of the horizontal cross section area may be substantially reduced comparatively and thus permit the production and use of large capacity coolers within a reasonable horizontal cross sectional area.

Accordingly, pads of one standard size may be used for many coolers having a wide range of CFM capacity.

Referring to FIG. 11 of the drawings, the foregoing will be apparent when considering the diagrammatic illustration of FIG. 11, wherein the evaporative cooler pad assembly 32 at its inlet 34 receives air as indicated by the arrows A, the air traveling in the direction of the arrows through the pad material 90 and during the travel of the air through the pad, water passing from the water distributor openings 46 is directed toward the inlet side 32 of the pad and as the water moves downward in the aspen fiber or other material, the flow of the air as indicated by arrows A tends to force the water to move toward the outlet side 38 of each evaporative cooler pad assembly, and consequently, in the lower area 102 of the pad assembly, the layer of saturated aspen fibers tends to become thinner due to the fact that the water has been forced during its gravitational movement, toward the outlet side 38 of the pad assembly and, therefore, only a relatively thin layer of the evaporative cooler pad material is fully saturated and, of course, the time element of the air passing through the thin section is such as to provide for only nominal evaporative cooling. In some instances where evaporative cooler pads have been of unreasonable vertical dimension, the water may be driven almost to the outlet side 38 of the pad, thereby causing dry spots in the lower portions of the pads and allowing air to pass through very readily without being subjected to the evaporative cooling effect and in such instances dry openings in pads allow a great amount of air to pass through and thus greatly reduce the evaporative cooling efficiency of the evaporative cooler. Accordingly, there has been a limit on the vertical dimension of the evaporative cooler pads due to this problem of the air passing horizontally through the pads tending to force the water to rear thereof, near the lower portion of the pads. This is illustrated graphically in FIG. 11, wherein the lower area of 102 is relatively thin in its fully saturated portion. The water passing from the lower portion of the pad area gravitates outward through the openings 48 and, as hereinbefore described, into a trough of the next lower evaporative cooling pad as shown in FIG. 5.

It will be appreciated by those skilled in the art that evaporative coolers may employ a series of superimposed evaporative cooler pads as shown in FIG. 5, such as to permit the pad areas of an evaporative cooler to attain a much greater vertical dimension and, consequently, in proportion allow reduction in the horizontal cross section area of an evaporative cooler, or conversely greatly increasing the capacity of a cooler of a given cross sectional area. Additionally, the employment of superimposed pad assemblies insures efficient evaporative cooling capacity of a pad of a given thickness. Heretofore, evaporative cooler pads of substantial elevation have been somewhat thicker than necessary in order that the lower portion of the pad has efficient saturated thickness for substantial evaporative cooling capacity. It will be understood by those skilled in the art that evaporative cooler pads from an economic standpoint must be quite thick if they are to have substantial vertical dimensions. Therefore, the present invention may employ pads which are relatively thinner and which are of a relatively nominal vertical dimension since these evaporative cooler pad assemblies are superimposed and progressively return the water to the inlet side of each pad assembly as the water passes from the water distributor openings 46 toward the inlet side 34 of each pad assembly. Therefore, the economy of producing disposable pad assemblies in accordance with the present invention may readily be appreciated due to the fact that from a functional efficiency standpoint the superimposed pads may be relatively thin due to the fact that they provide for substantially the overall cross section or thickness since they are limited in vertical dimension and, therefore, do not permit or provide for substantial thinning of the saturated area 102 near the lower portion of the outlet sides 38.

In the modification of the invention, as shown in FIG. 12, the entire pad assembly consists of a block of foam or other material designated 106 and the upper portion of this block of material 106 is provided with a V-shaped trough recess 108 therein. This trough recess is provided with a water tight coating 110 having void areas 112 which are the same shape as the trough outlet openings 46 shown in FIG. 10 of the drawings, thus the void areas 112 provide openings for the bottom of the trough such as outlet openings adapted to direct water toward an inlet side 114 of the pad assembly in a similar manner to the operation of the trough outlet openings 46 tending to direct water to the inlet side 34 of the pad assemblies 32 hereinbefore described. This coating 110 is provided with trough end portions 113, as shown in FIG. 13.

Accordingly, the pad assembly of the invention, as shown in FIG. 12 of the drawings, may be a hydroscopic foam material or an open cell foam material molded in a single block generally the shape of a pad assembly as shown in FIGS. 6-10 of the drawings. However, this pad assembly, shown in FIG. 12, may be a very economical evaporative cooler pad assembly when manufactured in an automated production facility. It will be understood that the evaporative cooler pad assembly is 32 as shown in FIG. 6 and 116 as shown in FIG. 12, may be made in one size compatible with the optimum elevation as described in connection with FIG. 11 and that this one size may be adapted to all evaporative coolers in accordance with the present invention due to the fact that several of these pads may be superimposed to provide for the desired cubic feet per minute flow capacity through the cooler. This contrasts with conventional evaporative coolers which, for example, may use various size pads. One cooler might use a pad 32 inches by 60 inches while another cooler may use a pad 40 inches by 90 inches, and the prior art contains a myriad of pad sizes, all of which is costly to inventory and to maintain control of production and, accordingly, the evaporative cooler pad assembly of the present invention capable of being superimposed may, therefore, provide for one standard size of evaporative cooler pads that may be used in all evaporative coolers. Furthermore, this one standard size may be optimized for evaporate performance within known parameters of the well known 80% saturation factory considered to be optimum. Accordingly, it will be appreciated that the one size of evaporative cooler pad may be optimized due to the fact that it may be of optimum thickness for the elevation thereof and in accordance with the density of the pad materials into which the trough structures deliver water and in which the water flows downwardly and toward the outlet side of the pad as it progresses toward the bottom of the pad. It will be appreciated by those skilled in the art that standardization of pad size as well as optimization of the evaporative cooling parameters thereof provides for a great performance advantage and that the integral trough being replaceable with the evaporative cooler pad obviates the old problem of using plugged or corroded troughs year after year when the evaporative cooling pad material is replaced.

In the disclosure of FIG. 5 of the drawings, the louvers 26 are spaced at their edges 27 from the inlet sides 34 of the evaporative cooler pad assembly 32 and thus louvers 27 are not contacted by water and subject to the flow of water thereover or the crusting of minerals thereon. Consequently, the louvers 26 may be vertically disposed rather than in the usual or conventional horizontal position wherein evaporative cooling pad material is packed against the inner edges of the louvers and the louvers are slanted downward to cause water that collects thereon to gravitate downwardly and inwardly toward the evaporative cooler pad. Accordingly, it will be seen that there is a substantial advantage in the spacing of the louvers from the inlet of the evaporative cooler pads and the vertical disposition thereof since vertically disposed louvers extending throughout a great elevation with superimposed pads may provide for substantial stiffness in the vertical direction inasmuch as the present invention relates to a plurality of superimposed pads and greater elevational extensions of the size of the cooler as well as the louvers. Accordingly, the vertical louvers are thus important in their spaced relation to the inlet size of the evaporative cooler pads and particularly where several superimposed evaporative cooler pads provide for substantial vertical dimensions of the side or louvered inlet portion of the evaporative cooler.

Figure 14:
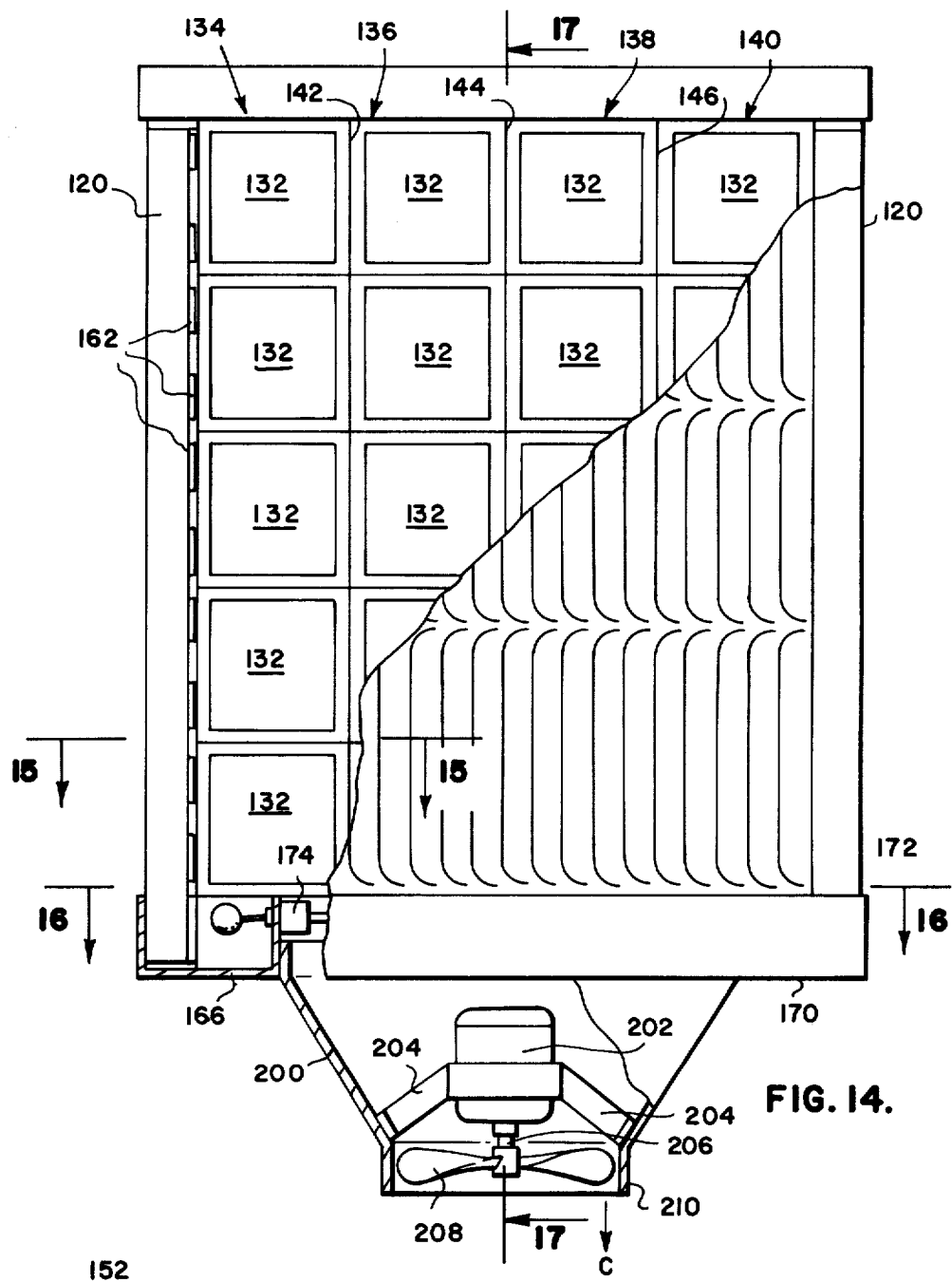
FIG. 14 is a side elevational view of a modification of the invention showing a down delivery cooler version of the invention and showing portions of the structure broken away and in section to amplify the illustration.

In the modification as shown in FIG. 14, the frame of the evaporative cooler is provided with corner posts 120 similar to the hereinbefore described corner posts 28. These corner posts 120 are coupled to a top member 122 by means of flanges 124 and access doors 126 are provided with hinges 128 adjacent the top member 122 and connected therewith. These hinges 128 permit the access doors 126 to move upward in a direction of an arrow A as indicated by broken lines 130 so as to provide for top opening structure above the trough areas of evaporative cooler pads 132 which are similar to those shown in FIGS. 12 and 13. The trough portions 110 being directly below water delivery conduits 44 and such that the access doors 126 provide for visual inspection of water delivered from the conduits 44 into the troughs 110 and so as to permit an operator or maintenance man to level the cooler so that the flow is uniform throughout the length of the troughs 110 and so as to permit the maintenance man to determine whether or not each conduit 44 is delivering water properly to the respective trough 110.

Figure 15:
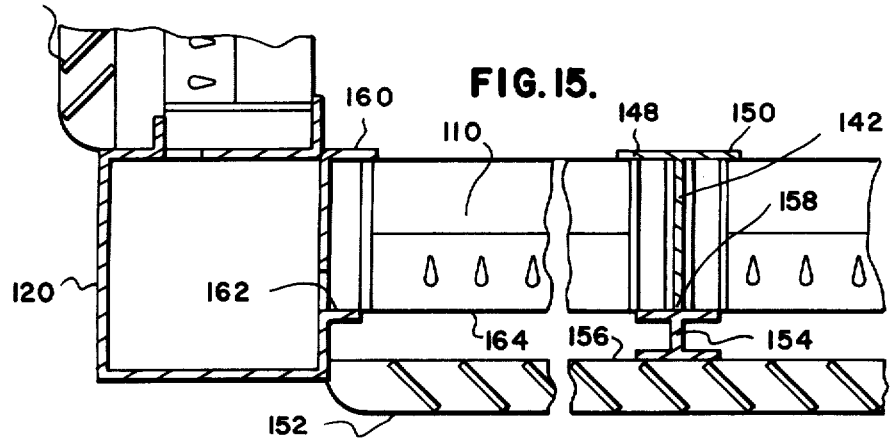
FIG. 15 is an enlarged fragmentary plan sectional view taken from the line 15—15 of FIG. 14.

As shown in FIGS. 14 and 15, all of the evaporative cooler pads 132 are of a standard size and are superimposed in a manner as hereinbefore described in connection with FIG. 5 of the drawings. Reference also being had to FIG. 17 of the drawings wherein these pads 132 are superimposed one above the other such that water draining from the bottom of one pad passes into the trough of the next adjacent pad and functions to successively deliver water toward the inlet side of the pad and in each instance the elevation of the pad is such that water does not become depleted at the outlet side of the pad near the lower portion thereof, all as hereinbefore described.

As shown in FIG. 14 of the drawings, a series of superimposed pads 132 or a plurality thereof is designated 134. Another plurality of pads 132 which are superimposed is designated 136. Yet another superimposed plurality designated 138 and a still further plurality being designated 140. The plurality of superimposed pads 136 is separated by the plurality 134 by means of a vertical partition member 142. Another partition member 144 separates the plurality 136 and 138 while a still further partition member 146 separates the plurality 138 and 140 respectively.

As shown in FIG. 15, the partition member 142 is representative of the structure of the partition members 142, 144 and 146 and this member 142 is disposed vertically and provided with supporting flanges 148 and 150 which support adjacent pads at opposite sides of the partition member 142 and at the rear thereof in the direction of air flow and connected with a removable louver grill 152 is a vertical spacer member 154 which is secured to the rear side 156 of the louver grill 152 and bears against an edge 158 of the partition member 142.

Each corner member 120 is provided with flange structure 160 similar to the flanges 52 hereinbefore described, and each corner member 120 is also provided with struck out tabs 162 similar to the tabs 54 hereinbefore described and these respective flange and tab portions 160 and 162 support edges of the superimposed pads near the corner members 120 while the partition members 142, 144 and 146 support the pads in lateral and vertical alignment in areas intermediate the corner posts 120. It will be seen that the louver grill 152 is provided with vertical louvers which permit sunlight to pass therebetween to a substantial extent so as to import ultraviolet rays to kill algae on the inlet surfaces of the evaporative cooler pads 132. The inlet surfaces being designated 164 in FIGS. 15 and 17 of the drawings. It will be seen that the louver grill 152 is spaced from the inlet sides 164 of the evaporator cooler pads 132 by means of the vertical spacer members 154.

The normally lower ends of the corner posts 120 are secured in individual sump pans 166, 168, 170 and 172, each of which is provided with a flood controlled water inlet valve 174 which is adapted to maintain water in each respective pan at a substantially constant level.

Disposed at each pan is a pump 176 coupled to a respective water delivery conduit 44 as hereinbefore described for delivering water from each respective pan to the trough portions at the upper areas of the evaporative cooler pads 132 as shown best in FIG. 17 of the drawings.

The separate pans 166, 168, 170 and 172 surround a downward delivery opening 178 as will hereinafter be described in detail.

The upper outer edge of each pan 166, 168, 170 and 172 supports a lower flange of an evaporative cooler inlet louver grill.

As an example, the pan 168 is provided with an upper edge 180 which supports a channel-shaped portion 182 at the generally lower portion of one of the louver grills 152.

The upper portion of the respective louver grill 152 is provided with an upwardly directed channel 184 which is held by a downwardly directed edge 186 of the hinge cover member 126 and these cover members 126 are provided with mitered corner portions 188 as shown in FIG. 18. These mitered corner portions 188 are contiguous with each other and are held down by a common rotatable fixture 190 which is provided with a screw threaded shank 192 engaged in a nut 194 held at the upper end of each respective corner member 120. When the nut 194 at its wing portions 196 are rotated into alignment with slots 198 in adjacent mitered edges 188 of the cover members 126. These cover members 126 may be pivoted upwardly in the direction of the arrow A so as to expose the upper portions of the troughs 110 and to release the channel portion 184 of the respective louver assembly 152 so that it may be pivoted outwardly away from the front portions of the evaporative cooler pad 132 and may be removed upwardly from the upper edge 180 of the respective pan 166. Thus the louver grill is locked into position when the lower edge 186 of the cover or door 126 is engaged with the channel portion 184 as shown in FIG. 17.

It will be appreciated that the door 126 may be opened and pivoted upwardly out of interference with the trough portions 110 when the evaporative cooler is running since the air moving in the direction of the arrow B in FIG. 17 of the drawings holds the grill as well as the evaporative cooler pads against the respective partition member flanges 148 and 150.

Thus when the evaporative cooler is running and the water is being delivered from the conduits 44 a maintenance man can determine the condition of the water delivery as well as the level condition of the troughs 110 so as to insure equal wetting and uniform wetting of all of the evaporative cooler pads 132 especially the several vertical series or superimposed plurality of pads shown in FIG. 14.

Communicating with the opening 178 between the trough structures 166, 168, 170 and 172 is a downwardly directed duct 200 which is secured to the respective sides of the pans hereinbefore described and a fan motor 202 is mounted in the duct 200 on radially directed arms 204 and the motor 202 is provided with a shaft 206 driving a fan 208 in a lower portion 210 of the duct 200 which portion surrounds the fan 208. The fan 208 is adapted to force air in the direction of the arrow C in FIG. 14 of the drawings to induce flow in the direction of the arrow B as shown in FIG. 7 to pass through the evaporative cooler pads 132.

It will be apparent to those skilled in the art that the superimposed plurality of pad assemblies offers substantial economy of the production and/or replacement of evaporative cooler pads as well as to provide for improved proportional relationships of evaporative cooler pads and their cooling capacity. The invention being particularly adapted for use in large evaporative coolers for industrial or other uses.

Further, it will be obvious to those skilled in the art that various modifications may be resorted to without departing from the spirit of the invention.

I claim:

1. In an evaporative cooler the combination of: a frame; a sump pan secured to a lower portion of said frame; a plurality of superimposed foraminous evaporative cooler pad assemblies held by said frame above said sump pan; each pad assembly having an inlet side and an outlet side; means for forcing air through said pad assemblies in a direction from said inlet side toward said outlet side; each of said pad assemblies having an upper portion; a water trough in said upper portion; each water trough having a plurality of water distributor openings disposed and adapted to deliver water to an upper portion of a respective pad assembly therebelow; a foraminous water holding pad means below each trough; each of said pad assemblies having a lower portion provided with a water outlet opening; means disposed for delivering water into the trough of an uppermost pad assembly of said plurality; one of said pad assemblies being disposed such that said water outlet opening thereof is disposed above and adjacent to said trough one of said superimposed pad assemblies whereby water which tends to be forced by air towards said outlet side of each pad assembly drains from a respective water outlet opening into a respective water trough of a next lower one of said pad assemblies whereupon the respective water distributor openings thereof direct water into the upper portion of the respective water holding pad means therebelow; an inlet louver grill supported by said frame in spaced relation to said inlet sides of said pad; said louver grill having a lower channel portion; pan means having an upper edge portion supporting said lower edge portion of said louver grill; said louver grill having an upper edge portion provided with an upwardly directed open channel portion; a pivoted access door pivotally mounted on an axis in spaced relation to said louver grill; said access door having an edge portion engageable in said upwardly directed channel portion at the upper edge of said louver grill and means for holding said access door downwardly such that it is held in engaged relation with said upwardly directed channel portion of said louver grill for holding the same in closed position.

2. In an evaporative cooler a main frame; an evaporative cooler pad supported in one side of said main frame; an inlet louver grill supported by said frame adjacent to said inlet side of said evaporative cooler pad; said louver grill having a lower portion; said frame having a portion supporting said lower portion of said louver grill; said louver grill having an upper portion; a pivoted access door pivotally mounted on said frame on an axis in spaced relation to said louver grill; said access door having means engageable with said upper portion of louver grill; said access door thus retaining said louver grill in position in said frame relative to said evaporative cooler pad.

* * * * *